Feb. 2, 1960 H. F. MURPHY 2,923,287
SPACE HEATING FURNACE
Filed June 21, 1957 3 Sheets-Sheet 2
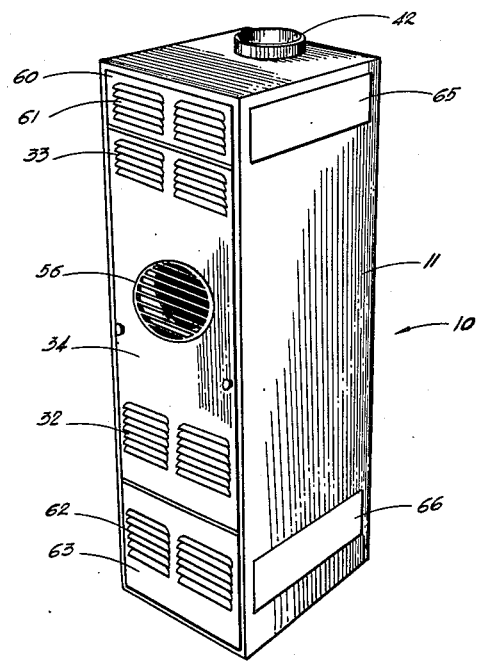
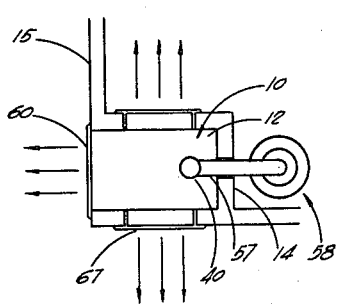
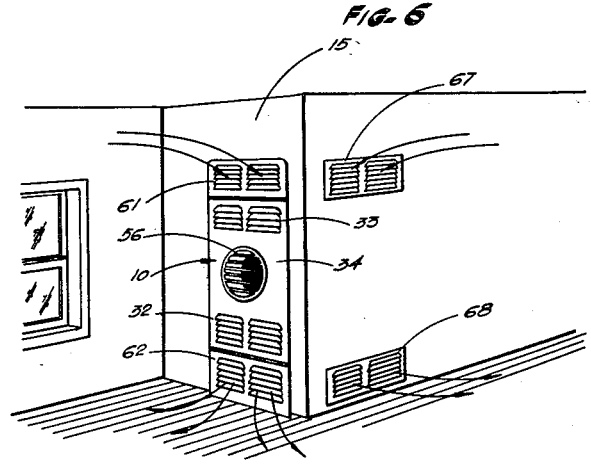
INVENTOR
HOWARD F. MURPHY
BY *A. G. Douras*
ATTORNEY Feb. 2, 1960 H. F. MURPHY 2,923,287
SPACE HEATING FURNACE
Filed June 21, 1957 3 Sheets-Sheet 3

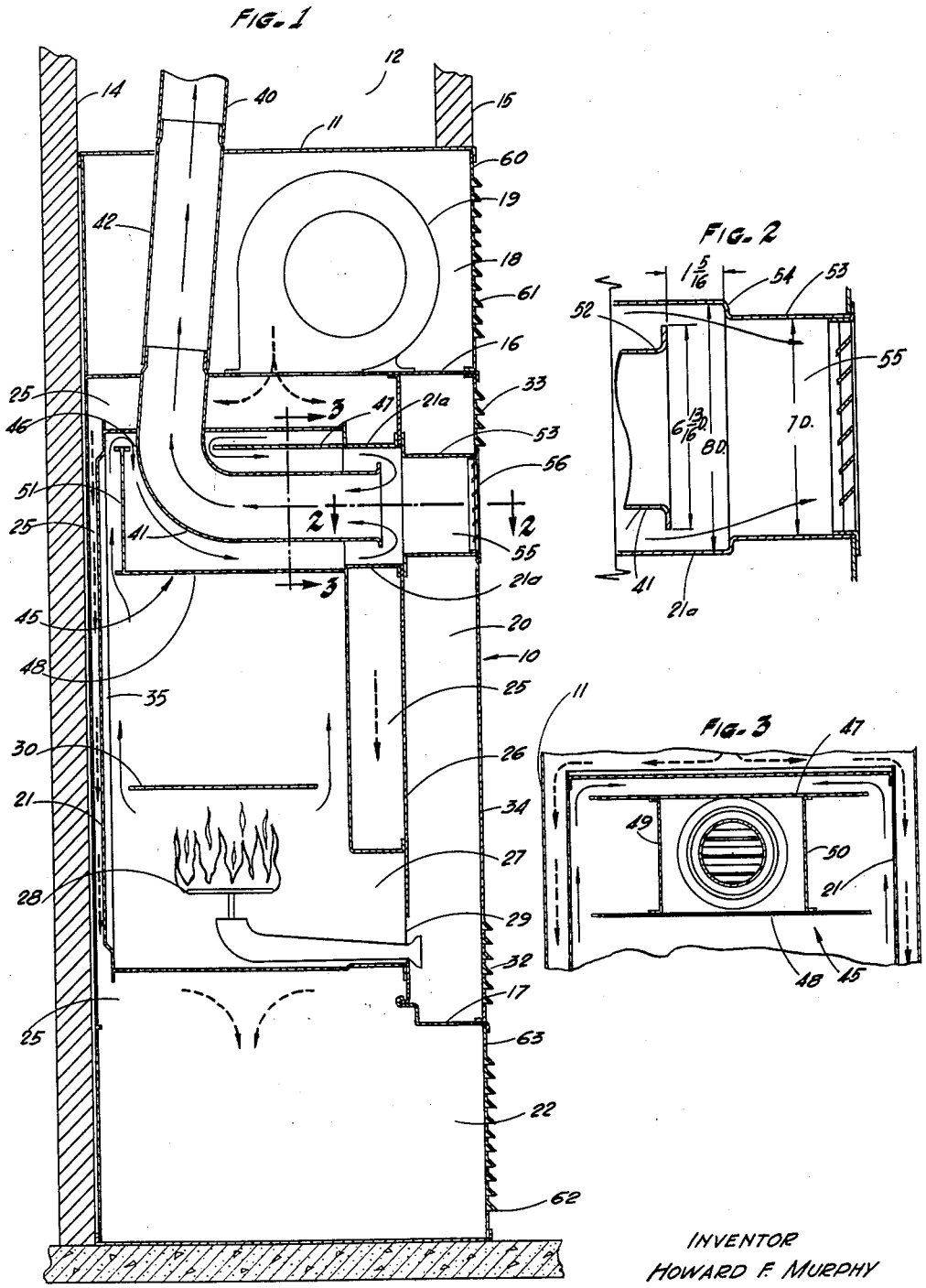

INVENTOR
HOWARD F. MURPHY

BY *A. G. Douvas*
ATTORNEY

United States Patent Office 2,923,287
Patented Feb. 2, 1960

2,923,287

SPACE HEATING FURNACE

Howard F. Murphy, Lebanon, Ind., assignor to Stewart-Warner Corporation, Indianapolis, Ind., a corporation of Virginia Application June 21, 1957, Serial No. 667,209

9 Claims. (Cl. 126—110)

The present invention relates to heating furnaces employing a heat exchanger around which heating air is circulated, and in particular to an improved draft diverter for use in furnaces of this type.

In many buildings, adequate heating can be economically attained by installing a furnace in a recess or utility room near the space to be heated. The inherent advantages of this arrangement can be further increased by minimizing the building space which must be withdrawn from other uses to accommodate the furnace. However, in reducing the floor area allocated to the furnace, a satisfactory furnace design must take into account not only the horizontal dimensions of the furnace but also the extent to which servicing the furnace, particularly the air circulating blower, can be complicated by reductions in the size of the building recess or utility room in which the furnace is installed.

Moreover, the degree to which reductions can be made in the horizontal dimensions of a furnace of this type is limited not only by the necessity of providing in the furnace the desired heating capacity but also by the desirability in many instances of leaving sufficient vertical space between the top of the furnace and the ceiling (which can be rather low in some residential buildings) to enable the exhaust vent from an adjacent water heater to be connected to the furnace flue.

Accordingly, a primary object of the installation is to provide an improved furnace which facilitates installation and servicing of the furnace within an extremely small building recess or the like while at the same time providing ample space at the top of the furnace for the attachment of a water heater vent to the furnace flue— all without increasing the horizontal dimensions of the furnace.

Another object is to provide an improved draft diverter which prevents spillage of combustion gases from the furnace under normal draft conditions while at the same time providing the inherent capacity to assure safe, efficient combustion under all draft conditions including downdraft, blocked flue, normal, and updraft. The draft diverter of this invention is integrated with the furnace heat exchanger in a manner which avoids any significant diminution of either the area or temperature of the heat exchanger surface of the furnace.

Another object is to achieve the above objects by means of an improved furnace construction which is basically simple and inherently economical to manufacture.

In order that all of the structural features for attaining the objects of this invention may be understood, detail reference is made to the drawings wherein:

Fig. 1 is a side view showing a transverse vertical section of a furnace embodying the invention and illustrating by arrows the flow of combustion gas under normal draft conditions;

Fig. 2 is a fragmentary horizontal sectional view on an enlarged scale, taken along the line 2—2 of Fig. 1, and illustrating by arrows the flow of combustion gas in response to blocked flue or downdraft conditions;

Fig. 3 is a fragmentary vertical sectional view on an enlarged scale, taken along the line 3—3 of Fig. 1, and showing the position of the draft hood elbow within the box baffle;

Fig. 4 is a schematic plan view showing the furnace of the invention incorporated within a small room;

Fig. 5 is a perspective view showing the external construction of the furnace of the preceding figures;

Fig. 6 is a perspective view showing a typical counterflow installation of the furnace of the preceding figures.

Figure 7:
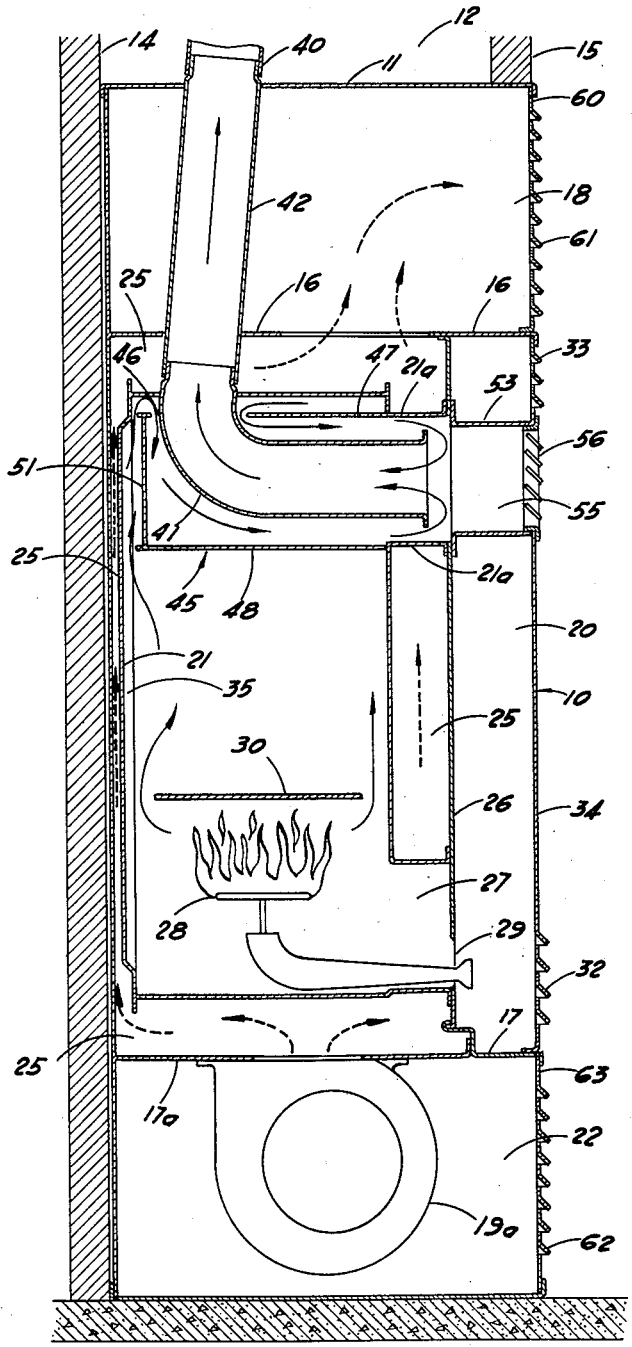
Fig. 7 is a view corresponding generally with that of Fig. 1 and including a blower modification to provide for upflow furnace operation.

Referring now to the drawings, the heating furnace 10 forming the illustrated embodiment of the invention comprises a box-like sheet metal shell or casing 11 adapted to fit closely within a small recess or utility room 12 (Fig. 4) in a private residence or similar building. Only fragmentary views of the building appear in the drawings (Figs. 1, 4, and 6). While the particular arrangement of the building structure in relation to the furnace can be varied, in a space heating installation the furnace is ordinarily installed on a building floor (Fig. 1) immediately adjacent the space to be heated by hot air from the furnace. The back of the furnace is preferably positioned closely adjacent a rear building wall 14, and the front of the furnace is preferably positioned within an opening cut in a front wall 15 so as to expose the front panels of the furnace. This arrangement enables the louver passages of the various front panels to communicate freely with the building spaces to be heated.

The interior of the furnace casing 11 is divided into three compartments by means of blower mounting plate 16 and support plate 17. An upper air blower compartment 18 houses the blower 19, a central compartment 20 houses the heat exchanger 21, and the lower compartment or plenum chamber 22 serves as a box for receiving and distributing the heated air in a counterflow installation. In an alternative arrangement shown in Fig. 7 adapted for upflow operation, blower 19a is positioned within plenum chamber 22 and is supported by an extension 17a to the support plate, and compartment 18 is employed to receive the heated air for distribution to the spaces to be heated.

The central compartment 20, defined by the blower mounting plate 16 and support plate 17, houses an upright heat exchanger 21 preferably fabricated of sheet metal and dimensioned to provide adequate passageways 25 between the exterior of the heat exchanger 21 and the adjacent structure of furnace casing 11, mounting plate 16, support plate 17 and bulkhead 26. Passages 25 permit the output air from blower 19 to be heated and circulated to the room areas through plenum chamber 22.

The heat exchanger 21 defines a chamber 27 in which fuel, preferably gas, is burned by means of a burner 28 extending into the lower portion of the chamber through opening 29 in bulkhead 26. Baffle plate 30 is supported within the heat exchanger chamber 27 by means of a plurality of supporting brackets, not shown.

Combustion air is admitted to the heat exchanger chamber 27 through opening 29, central compartment 20 and louvers 32 and 33 formed in front panel 34. A plurality of vertical fins, corresponding to fin 35, are affixed to the side walls of the heat exchanger shell 21, to increase the transfer of heat from the combustion gases within the chamber to the room heating air circulating through passages 25 surrounding the heat exchanger. The burned combustion gases are ultimately withdrawn from the furnace through a vertical flue 40 in a manner to be described hereinafter in detail.

Installation and servicing of the furnace 10 within a small room 12 no larger than the horizontal dimensions of the furnace are greatly facilitated by the positional arrangement of both the blower 19 and the flue 40. In many of the prior art arrangements, flue 40 is located near the front of the furnace and, therefore, conflict occurs between the flue 40 and the front wall 15 which prevents the installation of the furnace in a recess or opening flush with a front wall surface. Additionally, to gain access to the blower, service personnel must remove a panel other than an exposed front panel. This, of course, requires that the room containing the furnace be larger than minimum dimensions. In the arrangement shown in Fig. 1, removal of front panel 60 makes blower 19 readily accessible to service personnel and at the same time enables the economy of a recessed installation to be attained.

The foregoing advantages, resulting because of the front positioning of blower 19 and the rear positioning of flue 40, are attained by a draft diverter assembly which includes draft hood elbow 41 and draft hood pipe 42. As is best shown in Fig. 1, the major portion of draft hood elbow 41 is contained within a space in heat exchanger 27 defined by a box baffle 45. Incorporation of the draft hood elbow in association with box baffle 45 within the heat exchanger chamber 27, also enables a significant minimization in the height of the furnace which would otherwise be required by prior art arrangements. In a typical prior art installation, the height of the furnace must be increased approximately 8" to provide for a built-in draft diverter structure external to the heat exchanger so that the furnace can be installed in a recess flush with a front wall 15, such as is shown in Fig. 1.

The improved arrangement herein provides the desired structural and functional advantages without any significant diminution of the heating efficiency of the heat exchanger inasmuch as the draft diverter assembly does not reduce the effective area of exchange surface. Structurally the draft diverter assembly comprises the draft hood elbow 41 which has a substantially vertical end portion that extends through a circular aperture 46 located within the upper plate 47 of the box baffle 45. As is best shown in Figs. 1 and 3, the box baffle 45 comprises an upper plate 47, a lower plate 48, and a pair of side plates 49 and 50. The end portions of plates 47, 48, 49 and 50 are joined one to the other by means of end plate 51. The plates 47, 48, 49, and 50 are attached to the heat exchanger shell 21 only at the right edges of these plates as is best shown in Fig. 1. It should be noted that side plates 49 and 50 are separated from the adjacent sides of the heat exchanger to enable combustion gases to flow therebetween and into the annular opening 46 defined by draft hood elbow 41 and the upper plate 47. Combustion gases also pass between end plate 51 and the adjacent surfaces of heat exchanger shell 21 inasmuch as there is no attachment or supporting structure therebetween.

The upper portion of draft hood elbow 41 extends through blower mounting plate 16 and is coupled to draft hood pipe 42 which extends through the blower compartment 18. Flue products are removed from the upper or protruding portion of draft hood pipe 42 by means of flue pipe 40.

An annular restrictor ring 52 is integrally formed upon the right-hand end of draft hood elbow 41. An annular portion 21a of the heat exchanger shell immediately adjacent restrictor ring 52 is concentric with the adjacent edges of the restrictor ring and also the horizontal portion of the draft hood elbow 41. A cylindrical draft hood relief collar 53 is supported on bulkhead 26 to provide a relief draft outlet 55, as is set forth in detail hereinafter. A circular louvered vent 56 covers the opening of relief outlet 55.

It should be noted that the inside diameter of draft hood relief collar 53 is less than the inside diameter of the annular portion 21a of the head exchanger shell (Fig. 2). This arrangement provides a shoulder 54 which is effective during normal furnace operation to turn all of the combustion gases 180° so that they will flow through draft hood elbow 41, as is shown by the arrows located within box baffle 45 in Fig. 1. The outer diameter of restrictor ring 52 is preferably slightly less than the inner diameter of the draft hood relief collar 53. The restrictor ring 52 is preferably sized so as to provide an annular area which will create sufficient back pressure in the top of the furnace to regulate the secondary air for combustion and bring the carbon dioxide up to the maximum safe limit. For example, the actual area of a 5" diameter flue pipe 40 needed for venting is 19.6 square inches (the cross-sectional area of draft hood elbow 41) and the annular area between the restrictor ring 52 and annular portion 21a of the heat exchanger 21 need be only 13.8 square inches. This selection of component sizes brings the $CO_2$ up to approximately 8.5%.

The most important dimensional relationship in the design of the draft diverter assembly is the diameter of the relief opening 55 and the distance from the restrictor ring 52 to shoulder 54. As has been previously noted, the diameter of the relief opening 55 is slightly larger than the diameter of the restrictor ring. In a preferred embodiment, the diameter of the relief opening 55 is 7", the diameter of the restrictor ring is $6^{13}/_{16}$", and the spacing between the restrictor ring 52 and the shoulder 54 is $1^{5}/_{16}$". If the relief opening were smaller than this, or the restrictor ring closer to the shoulder, partial blocking of the smooth flow which is normally attainable during blocked flue or downdraft conditions in a manner shown by the arrows of Fig. 2 would result in unsafe combustion. If the relief opening 55 were larger than this, shoulder 54 would be insufficient in area to turn the combustion gases 180° under normal operation or updraft. The distance between the restrictor ring 52 and the shoulder 54 is important under normal and updraft operation also, because if this distance is too small there will be insufficient room for the combustion gases to make a smooth turn and partial choking of the flow will result in inefficient and unsafe combustion. If the distance is too great, the effectiveness of the shoulder in turning the gases will be diminished and part of the combustion gases will spill out into the room through the relief opening 55 under normal operation.

During normal or updraft conditions in flue 40, combustion gas enters draft hood elbow 41. In entering the forward end of the elbow, the combustion gas is commingled with ambient air from the adjacent room space which enters through the draft relief collar 53. This reduces the temperature of the gas rising through the flue 40.

The ambient air supply to the restrictor end of the draft hood elbow 41 is self regulating to compensate for any abnormal updraft in the flue 40. An abnormally high draft in the draft hood elbow 41 merely pulls additional air from the adjacent room space through the draft relief collar 53 without materially affecting the differential pressure which determines the rate at which combustion gas is discharged through draft hood elbow 41. The result is to maintain complete and efficient combustion in the furnace under updraft conditions as well as normal draft conditions in the flue 40.

Complete and efficient combustion in the furnace is also maintained during downdraft in the flue 40 as well as under any abnormal conditions which may partially or completely block the flue. The velocity of the combustion gas deflected radially inwardly by the shoulder 54 is such that in the event of a downdraft in the flue 40 or a reduction in the normal draft in the flue to a value which is insufficient to carry away the combustion gases, these gases are freely discharged from the furnace through the draft relief collar 53 as indicated by the arrows in Fig. 2. The freedom with which the burned gases can escape out into the room adjacent the furnace stabilizes the back pressure within the box baffle 45 under such abnormal draft conditions. Thus complete and efficient combustion is maintained in the furnace under all possible draft conditions of the flue 40.

It should also be noted that the draft diverter assembly is incorporated into the upper end of the chamber 27 without appreciable diminution in the overall heat transferring efficiency of the heat exchanger 21. Accommodation of the diverter assembly within the exchanger chamber does not materially diminish the external surface area of the heat exchanger. The openings through the heat exchanger surface for the upwardly extending elbow 41 and for the draft relief collar 53 replace only a very small fraction of the total external area of the heat exchanger. Moreover, the entire heat transfer area of the heat exchanger 21 is scrubbed internally by hot combustion gases within the chamber 27. As previously mentioned, hot combustion gas rises up around both sides and around the rear end of the box baffle 45 to circulate freely over the top of the box baffle in close contact with the upper end of the heat exchanger. The effect of this is to maintain a high heat exchanging rate across substantially the entire heat exchanger surface.

Operating efficiency is further promoted by the fact that the annular stream of hot combustion gas which flows forwardly through the passages between box baffle 45 and elbow 41 prevents cooling of the hot combustion gases in the chamber 27 by the relatively cool room air entering the forward end of the elbow 41 through relief opening 55.

The compressed height of the improved furnace 10 provides adequate space above the furnace for connecting to the furnace flue 40 and exhaust vent 57 from a fired water heater 58, shown in Fig. 4.

In the event that burner 10 is to be employed in a space heating installation, the room air supplied to blower 19 by means of louvers 61 formed in panel 60 is returned to the space to be heated by means of louvers 62 located in the front panel 63 of plenum chamber 22. In the event that side air supply and air return louver panels are desired in a particular installation, such as that shown in Fig. 6, the side covering panels 65 and 66 (Fig. 5) are replaced by louver panels 67 and 68 shown in Fig. 6.

The furnace of this invention also may be readily adapted for the heating of remote rooms by underfloor ducts located in slab or crawl space for counterflow installations, or overhead ducts for upflow installations. In these alternative arrangements the appropriate duct work is coupled to chambers 18 and 19 as required, and the blower located within the appropriate chamber.

It is to be understood that the above-described arrangements are illustrative of the application of the principles of this invention. Numerous other arrangements may be devised by those skilled in the art without departing from the scope of the invention.

Having thus described the invention, what is claimed as new and desired to be secured by Letters Patent is:

1. A space heating furnace comprising, in combination, heat exchanger structure defining an inner space for combustion gas, a fluid fuel burner mounted in association with said heat exchanger structure to supply fluid fuel into the lower portion of said inner space, a hollow elongated baffle housing mounted in the upper portion of said inner space to extend generally from front to rear therein in spaced relation to the heat exchanger structure above and on opposite sides of the baffle housing, an air circulating blower mounted immediately above the forward portion of said heat exchanger structure to circulate air around the latter, a draft hood pipe located to the rear of said blower and extending downwardly into the rear end of said baffle housing through the rear portion of said heat exchanger structure, the upper rear portion of said baffle housing defining an opening therethrough connecting the rear interior of said baffle housing with the adjacent inner heat exchanger space, an exhaust conduit connected with the housing end of said draft hood pipe and extending forwardly through the housing in radially spaced relation thereto to define therewith a combustion gas passageway, said exhaust conduit having a forward end terminating a short distance outside of the forward end of said housing, an annular restrictor on the forward end of said exhaust conduit extending radially outward to an outer periphery spaced radially inward from the adjacent exchanger structure to define therewith a draft restrictive outlet encircling the restrictor, an annular shoulder spaced forwardly of said restrictor and extending radially toward the axis of said conduit from the inner surface of the encircling exchanger structure to an inner periphery having a diameter approximately equal to the outer diameter of said restrictor, circular draft relief means extending forwardly from said shoulder to define a forwardly open draft relief opening communicating with the forward end of said exhaust conduit through the open area encircled by said shoulder, the transverse area of said draft relief opening being at least equal to the open area encircled by said shoulder, and said shoulder having a forward spacing from said restrictor which is sufficient to avoid restricting the outflow of gas from said restrictive outlet and which is sufficiently close to turn the outflow of gas from said outlet radially inward toward the extended axis of said exhaust conduit.

2. A heating furnace comprising a furnace casing divided into upper, lower and central compartments by a horizontal blower deck and a support plate and including separate front panels for each compartment, a blower positioned within the upper compartment and mounted on the blower deck adjacent the associated front panel, a bulkhead dividing the central compartment vertically, a heat exchanger shell mounted within the central compartment and spaced from said casing, blower deck, support plate and bulkhead to define air circulating passages therebetween which communicate said blower with said lower compartment, a fluid fuel burner mounted in association with said heat exchanger shell to supply fluid fuel into the inner chamber defined by the heat exchanger shell, a box baffle supported within an upper portion of the heat exchanger chamber and spaced from the back and sides of the heat exchanger shell to enable combustion gases to enter an aperture located at the top of the box baffle, a draft hood elbow positioned partially within the box baffle and having a first end portion extending through said baffle aperture and said blower deck into the rear of said blower compartment and a second end portion extending generally horizontally within said box baffle toward the front of the furnace, said elbow being in spaced relationship with the edges of said baffle aperture to define an annular passage for entry of combustion gases into said box baffle, a restrictor ring supported on the end of said second elbow portion and being positioned in spaced relationship with the edges of a circular opening formed in said exchanger shell, a cylindrical draft relief collar axially aligned with the circular opening and forming a draft relief outlet for the interior of said box baffle, said draft relief collar having an inner diameter less than the diameter of said circular opening but greater than the outer diameter of said restrictor ring to form a shoulder parallel to and spaced from said restrictor ring, and means defining a flue outlet communicating with the first end portion of said elbow.

3. A heating furnace comprising a furnace casing divided into two end compartments and a central compartment by a pair of spaced support plates and including separate front panels for each compartment, a blower positioned within a first of the end compartments, a heat exchanger shell mounted within the central compartment and spaced from said casing to define air circulating passages therebetween which communicate said blower with said second end compartment, a fluid fuel burner mounted in association with said heat exchanger shell to supply fluid fuel into the inner chamber defined by the heat exchanger shell, a box baffle supported within an upper portion of the heat exchanger chamber and spaced from some of the inside walls of the heat exchanger shell to enable combustion gases to enter an aperture located at the top of the box baffle, a draft hood elbow positioned partially within the box baffle and having a first end portion extending through said baffle aperture and one of said support plates into the rear of one of said end compartments and a second end portion extending generally horizontally within said box baffle toward the front of the furnace, said elbow being in spaced relationship with the edges of said baffle aperture to define an annular passage for entry of combustion gases into said box baffle, a restrictor ring supported on the end of said second elbow portion and being positioned in spaced relationship with the edges of a circular opening formed in said exchanger shell, a cylindrical draft relief collar axially aligned with the circular opening and forming a draft relief outlet for the interior of said box baffle, said draft relief collar having an inner diameter less than the diameter of said circular opening but greater than the outer diameter of said restrictor ring to form a shoulder parallel to and spaced from said restrictor ring, and means defining a flue outlet communicating with the first end portion of said elbow.

4. In a heating furnace including a furnace casing, a heat exchanger positioned within said casing, a fluid fuel burner mounted in association with said heat exchanger, and means defining air circulating passages external to said heat exchanger, the improvement relating to a draft diverter comprising a baffle housing positioned within said heat exchanger and having an inlet aperture for combustion gases, an elbow conduit extending through said baffle aperture in spaced relation to the edges thereof to define therebetween a combustion gas inlet into said baffle housing, flue exhaust means coupled to a first portion of said conduit projecting externally from said aperture, a restrictor ring formed on the end of a second portion of said conduit extending through said baffle housing, means integral with said heat exchanger forming a circular opening in said exchanger surrounding said restrictor ring and communicating into said elbow and said baffle housing, said second conduit portion being in spaced relation relative to the baffle housing to form a combustion gas passage which is restricted by said ring, cylindrical means defining a draft relief opening communicating with the end of said conduit formed with the restrictor ring and being connected to the means forming the circular opening in said exchanger, said draft relief means having a smaller inside diameter than the inside diameter of said means forming the circular opening whereby a combustion gas turning shoulder parallel to and spaced from said restrictor ring is formed.

5. In a heating furnace including a furnace casing, a heat exchanger positioned within said casing, a fluid fuel burner mounted in association with said heat exchanger, and means defining air circulating passages external to said heat exchanger, the improvement relating to a draft diverter comprising a baffle housing positioned within said heat exchanger and having an inlet aperture for combustion gases, a cylindrical combustion gas conduit of elbow configuration extending into said baffle through said inlet aperture in spaced relation to the edges defining said aperture, said elbow conduit being confined partially within said baffle housing and spaced from the walls thereof to form a combustion gas passage therebetween which communicates said inlet aperture with an end opening in said conduit, a second cylindrical conduit axially aligned with and spaced from the section of said elbow conduit adjacent said second conduit and forming a draft relief outlet communicating with said baffle housing and the end opening of said conduit, said elbow conduit having an inside diameter less than the inside diameter of said second conduit, an annular gas-flow restrictor ring radially projecting from the end of said first conduit adjacent said second conduit and having an outer diameter approximately equal to the inside diameter of the second conduit, and means connecting said housing and said draft relief conduit so as to define an annular passage around said restrictor ring and a gas turning shoulder spaced from said annular passage.

6. In a heating furnace including a furnace casing, a heat exchanger positioned within said casing, a fluid fuel burner mounted in association with said heat exchanger, and means defining air circulating passages external to said heat exchanger, the improvement relating to a draft diverter comprising a baffle housing positioned within said heat exchanger and having an inlet aperture for combustion gases, a cylindrical combustion gas exhaust conduit extending into and confined partially within said baffle housing and spaced from the walls thereof to form a combustion gas passage therebetween which communicates said inlet aperture with an end opening in said conduit, a second cylindrical conduit axially aligned with and spaced from the section of said first conduit adjacent said second conduit and forming a draft relief outlet communicating with said baffle housing and the end opening of said conduit, an annular gas-flow restrictor ring radially projecting from the end of said first conduit adjacent said second conduit, and means connecting said housing and said draft relief conduit so as to define an annular passage around said restrictor ring and a gas turning shoulder spaced from said annular passage.

7. In a heating furnace including a furnace casing, a heat exchanger positioned within said casing, a fluid fuel burner mounted in association with said heat exchanger, and means defining air circulating passages external to said heat exchanger, the improvement relating to a draft diverter comprising a baffle housing positioned within said heat exchanger and having an inlet aperture for combustion gases, a cylindrical combustion gas conduit extending into and confined partially within said baffle housing and spaced from the walls thereof to form a combustion gas passage therebetween which communicates said inlet aperture with an end opening in said conduit, an annular gas-flow restrictor ring radially projecting from the end of said conduit into said gas passage, and means forming a draft relief outlet communicating with said baffle housing and the end opening of said conduit and presenting a shoulder to the gas passage around said restrictor ring for turning combustion gases 180° into said end opening during normal and updraft furnace operating conditions.

8. In a heating furnace including a furnace casing, a heat exchanger positioned within said casing, a fluid fuel burner mounted in association with said heat exchanger, and means defining air circulating passages external to said heat exchanger, the improvement relating to a draft diverter comprising a baffle housing positioned within said heat exchanger and having an inlet aperture for combustion gases, a combustion gas exhaust conduit extending into and confined partially within said baffle housing and spaced from the walls thereof to form a combustion gas passage therebetween which communicates said inlet aperture with an end opening in said conduit, and means forming a draft relief outlet communicating with said baffle housing and the end opening of said conduit and presenting a gas turning shoulder to the passage between said first conduit and said housing.

9. A heating furnace comprising, in combination, heat exchanger structure defining an inner space for combustion gas, a fluid fuel burner mounted in association with said heat exchanger structure to supply fluid fuel into said inner space, a hollow elongated baffle housing mounted in said inner heat exchanger spaced to extend generally from front to rear therein, a draft hood pipe extending downwardly into the rear end of said baffle housing through the rear portion of said heat exchanger structure, the rear portion of said housing defining an opening thereinto communicating with the adjacent inner space in said heat exchanger structure, an exhaust conduit connected with the housing end of said draft hood pipe and extending forwardly through the housing in radially spaced relation thereto to define therewith a combustion gas passageway, means defining a restrictive outlet connecting said passageway with the forward end of said exhaust conduit, and means defining an outwardly open draft relief opening communicating with the forward end of said exhaust conduit and having a transverse size larger than the transverse size of said exhaust conduit.

References Cited in the file of this patent

UNITED STATES PATENTS

| | | |
|---|---|---|
| 517,321 | Allingham | Mar. 27, 1894 |
| 2,222,663 | Handley | Nov. 26, 1940 |
| 2,484,457 | Marble | Oct. 11, 1949 |
| 2,660,159 | Hughes | Nov. 24, 1953 |
| 2,693,914 | Payne | Nov. 6, 1954 |
| 2,789,555 | Morrow | Apr. 23, 1957 |
| 2,792,826 | Kilbury | May 21, 1957 |

UNITED STATES PATENT OFFICE

CERTIFICATE OF CORRECTION

Patent No. 2,923,287                          February 2, 1960

Howard F. Murphy

It is hereby certified that error appears in the printed specification of the above numbered patent requiring correction and that the said Letters Patent should read as corrected below.

Column 1, line 41, for "installation" read -- invention --.

Signed and sealed this 26th day of July 1960.

(SEAL)
Attest:

KARL H. AXLINE                                   ROBERT C. WATSON
Attesting Officer                                  Commissioner of Patents